United States Patent

Lowe

[19]

[11] Patent Number: 6,055,031
[45] Date of Patent: Apr. 25, 2000

[54] HIGH REFLECTIVITY LIQUID CRYSTAL DISPLAY CELL

[75] Inventor: Anthony Cyril Lowe, Braishfield, United Kingdom

[73] Assignee: International Business Machines Corporation, Armonk, N.Y.

[21] Appl. No.: 09/128,444

[22] Filed: Aug. 3, 1998

[30] Foreign Application Priority Data

Feb. 4, 1998 [GB] United Kingdom ................... 9802287

[51] Int. Cl.[7] .............................................. G02F 1/1347
[52] U.S. Cl. ............................ 349/74; 349/77; 349/78; 349/79
[58] Field of Search ................................ 349/74, 75, 76, 349/77, 78, 79, 80

[56] References Cited

U.S. PATENT DOCUMENTS

| | | | |
|---|---|---|---|
| 4,460,248 | 7/1984 | Shirai | 350/335 |
| 4,556,286 | 12/1985 | Uchida et al. | 349/79 |
| 4,581,608 | 4/1986 | Aftergut et al. | 340/704 |
| 4,637,687 | 1/1987 | Haim et al. | 350/335 |
| 4,878,741 | 11/1989 | Fergason | 349/86 |
| 5,200,845 | 4/1993 | Crooker et al. | 359/51 |
| 5,384,067 | 1/1995 | Doane et al. | 252/299 |
| 5,437,811 | 8/1995 | Doane et al. | 252/299 |
| 5,453,863 | 9/1995 | West et al. | 359/91 |
| 5,508,831 | 4/1996 | Nakamura et al. | 359/51 |
| 5,680,184 | 10/1997 | Nishino | 349/78 |
| 5,790,215 | 8/1998 | Sugaha et al. | 349/74 |
| 5,796,447 | 8/1998 | Okumura et al. | 349/74 |
| 5,801,796 | 9/1998 | Lowe | 349/74 |

FOREIGN PATENT DOCUMENTS

| | | |
|---|---|---|
| 0 426 291 | 5/1991 | European Pat. Off. . |
| 0 435 676 | 7/1991 | European Pat. Off. . |
| 8-278490 | 6/1994 | Japan . |
| 7-159805 | 10/1996 | Japan . |

OTHER PUBLICATIONS

G H Heilmeier and L A Zanoni, "Guest–Host Interactions in Nematic Liquid Crystals. A New Electro–Optic Effect", 1968, pp 91–92.

A C Lowe, "Assessment of Nematic Guest–Host Systems for Application to Integrated Liquid Crystal Displays", 1981, vol. 66, pp 295–308.

D L White and G N Taylor, "New Absorptive Mode Reflective Liquid–Crystal Display Device", 1974, vol. 45, pp 4718–4723.

Uchida et al, "Bright Dichoroic Guest–Host LCDs Without a Polarizer", SID International Symposium Digest of Technical Papers, 1980.

Primary Examiner—James A. Dudek
Attorney, Agent, or Firm—Scully, Scott, Murphy, Presser; Jay P. Sbrollini

[57] ABSTRACT

A novel multi-layer display cell is disclosed in which contrast ratios similar to that available from cells which use polarisers are achieved, as well as levels of reflectivity similar to that available from cells that do not use polarisers. This is achieved by using two or more compartments for the display cell separated by dielectric membranes. The electro-optic characteristics of the mixture in the two compartments differs in that the mixture in one of the compartments switches at a low voltage, being switched completely below the switching threshold of material in the other of the compartments.

13 Claims, 5 Drawing Sheets

HIGH REFLECTIVITY LIQUID CRYSTAL DISPLAY CELL

RELATED APPLICATIONS

The present invention is related to the following pending application:

Application Ser. No. 08/644,556, filed May 10, 1996, and entitled "STACKED PARALLAX-FREE LIQUID CRYSTAL DISPLAY CELL" (further identified as Attorney Docket No YO9-96-062).

FIELD OF THE INVENTION

The present invention relates to a liquid crystal display cell, having two or more compartments, the compartments being separated by thin membranes, the cell being suitable for use in flat panel displays.

BACKGROUND OF THE INVENTION

The performance of a flat panel liquid crystal display may be inferior to that required, if a display cell having a single compartment is employed. This can be the case for both reflective and transmissive, or backlit displays. In the case of reflective displays, either the contrast ratio (CR) or the reflectivity (R), or both, may be lower than required, or some other property, such as the display operating voltage, may be outside the required range, as the following examples of existing art will show.

EXAMPLE 1

Nematic Guest-Host Display

A Nematic Guest-Host display (Heilmeier GH and Zanoni LA, Appl. Phys. Lett., Vol.13, p.91 (1968)) uses a solution of a dichroic dye (guest) in a nematic liquid crystal (host). The nematic liquid crystal is aligned substantially parallel to the display substrates. The properties of the dichroic dye (guest) molecules are chosen so that they align parallel to the liquid crystal (host) molecules and so that the transition dipole for the absorption of visible light, which is substantially parallel to the geometric axis of the guest dye molecules, is therefore also substantially parallel to the alignment direction of the host liquid crystal molecules.

The alignment direction on the upper and lower substrates may be either parallel to each other or, for optimum performance, orthogonal to each other (Lowe AC, Mol. Cryst. Liq. Cryst., Vol.66, p.295, 1981). The display is viewed through a polarising film oriented with its transmitting axis parallel to the alignment direction on the upper substrate. Thus the guest-host layer is illuminated only with light of the polarisation state which can be absorbed by the guest dye molecules; absorption of light is efficient and the display appears dark. The typical reflectivity in the dark state is 1.2%.

When an electric field is applied across the guest-host (G-H) layer by means of electrodes on the upper and lower substrates, the liquid crystal (host) and therefore also the dye molecules (guest) are rotated perpendicular to the plane of the display, in which orientation little light is absorbed by the dye and the display appears light. However, reflectivity is undesirably low at about 24%, caused by 50% absorption by the polariser and additional absorption by the dye.

Contrast ratios in excess of 12:1 can be obtained in such displays. However, the light state reflectivity is greatly reduced by the presence of the polariser which reduces reflectivity to a practical maximum of about 24%. The operating voltage of such a display is low at about 4 volts for full turn-on.

EXAMPLE 2

Cholesteric Guest-Host Display

This is a development of the nematic guest-host display of Example 1. By the addition of chiral material to the guest-host mixture to produce a pitch length a few times greater than the wavelength of visible light (White D L and Taylor G N, J. Appl. Phys., Vol.45, p 4718 (1974)) both polarisations of incident light can be absorbed and a front polariser is no longer required. This increases the light-state reflectivity. However, this has the effect of increasing the threshold voltage by a factor of 4–5 over the nematic G-H of Example 1. Moreover, the voltage required for complete turn-on of the device is also increased and the absorption of unpolarised light in the field-off state is less efficient than the absorption of polarised light of Example 1, so either contrast ratio or reflectivity must be compromised. Reflectivity in excess of 50% can be obtained in such displays, but the contrast at this reflectivity is limited to about 9:1.

EXAMPLE 3

Cholesteric Texture Effects

These effects make use of the fact that chiral nematic systems reflect light of wavelength, $\lambda$, where $\lambda$ is related to the 360 degree pitch length of the liquid crystal, P, and the average refractive index, $n_a$, of the liquid crystal by $\lambda = n_a P$. (Crooker et al, U.S. Pat. No. 5,200,845; Doane et al, U.S. Pat. No. 5,384,067; Doane et al, U.S. Pat. No. 5,437,811; West et al, U.S. Pat. No. 5,453,863).

However, the liquid crystal layer reflects circularly polarised light such that the electric vector of the reflected light is a mirror image of the chiral helix; i.e., a right handed helix will reflect only right-handed circular polarised light. Unpolarised light can be considered to be composed of two oppositely-handed circular polarised components. Thus the theoretical limit of reflectivity of a chiral layer is 50%. In practice, it is less than this—about 40%. When an electric field is applied across the liquid crystal layer, the molecules are rotated by the field, the chiral structure is broken, the layer transmits light incident upon it and the only light reflected is from stray reflections at interfaces in the display structure. The transmitted light is absorbed by means of a light absorbing layer formed on the rear surface of the display. Thus cholesteric texture effect cells have a desirable low reflectivity state of a few percent, but their maximum reflectivity is about 40%, which limits the contrast ratio to about 5:1 to 6:1. Moreover, the wavelength range $\Delta\lambda$ of the reflected light is governed by the refractive index anisotropy $\Delta n$ of the liquid crystal. In practical terms, $\Delta\lambda$ is limited to about 100 nm, so these displays will always be coloured, making the realisation of an achromic (black/white) display impossible.

EXAMPLE 4

Stacked Structure of Two or More Cells

The contrast and/or reflection performance of displays can be improved by using a stacked structure of two or more cells. Other examples of known art relate to the use of stacked cells (Haim et al, U.S. Pat. No. 4,637,687; Crooker et al, U.S. Pat. No. 5,200,845, Uchida et al, SID International Symposium Digest of Technical Papers XI, 41 (1981)). These are formed by stacking separate cells, or by making more complex cells in which an intermediate substrate is shared by both cells, forming the rear surface of the front cell and the front surface of the rear cell.

Published German patent application No. 19711827.5, corresponding to U.S. patent application Ser. No. 08/644,556 (Attorney docket reference YO9-96-062) discloses a cell construction which enables stacked cells to be formed in which the intermediate substrate is so thin that little or no parallax occurs between the images formed in the two or more cells. In addition, the thickness of the intermediate substrate is such that the field drop across it is sufficiently low (about 25%) compared to that across the liquid crystal layers, that the stacked cell can be addressed as a single cell. This greatly simplifies and reduces the cost of the interconnections and drive electronics. The avoidance of the need for transparent electrodes on both surfaces of the intermediate substrate also improves transmittance (and reflectivity) of the device.

It is an object of the present invention to provide an improved liquid crystal cell.

It is another object of the present invention to provide an improved liquid crystal display which achieves a contrast ratio similar to that available from liquid crystal displays which use polarisers and reflectivity similar to that available from cells which do use polarisers.

DISCLOSURE OF THE INVENTION

Accordingly the invention provides a liquid crystal display cell comprising at least two compartments separated by thin transparent membranes, a first compartment nearer to the observer containing a first liquid crystal mixture and a second compartment further from the observer containing a second liquid crystal mixture, the electro-optic characteristics of the first and second mixtures being such that the first and second mixtures switch in a different, substantially nonoverlapping range of applied electric fields.

In a first embodiment, the mixture in the first compartment switches substantially completely at a voltage below the threshold of the mixture in the second compartment, the cell is normally white, the mixture in the first compartment is a negative dielectric anisotropy guest-host mixture with homeotropic alignment and the mixture in the second compartment is a negative dielectric anisotropy mixture with homeotropic alignment.

In a second embodiment, the second mixture substantially switches completely at a voltage below the threshold of the first mixture, the cell is normally dark, the guest-host mixture in the first compartment is a positive dielectric anisotropy guest-host mixture with homogeneous alignment and the mixture in the second compartment is a positive dielectric anisotropy mixture with homogeneous alignment.

In the first and second embodiments, the substrate is preferably reflective.

In a further embodiment, the cell comprises at least three compartments, a third compartment being separated from the second compartment by a thin transparent membrane, being furthest from the observer and containing a guest-host mixture, said mixture being aligned substantially perpendicular to the mixture in the first compartment. Preferably, the guest-host mixture in the first compartment is aligned substantially perpendicular to the guest-host mixture in the third compartment.

In the further embodiments, the substrate is preferably transmissive.

The membranes are preferably of the order of 1 micron or less in thickness.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
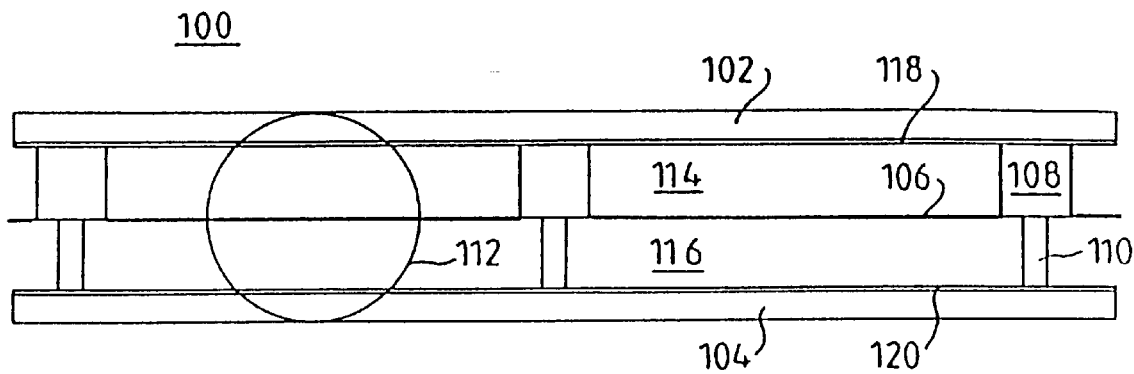
FIG. 1 shows a cross-section of a cell according to the present invention.

FIG. 1 shows a cross-section of a reflective cell 100 comprising a transparent front substrate 102 and a reflective rear substrate 104. A thin dielectric membrane 106 is supported between substrates 102 and 104 by means of precisely located spacers 108, 110. Two compartments 114, 116 are formed, which are filled with liquid crystal material. Substrate 102 is coated with a transparent electrically conducting material 118 such as indium-tin oxide (ITO) on its inner surface. Substrate 104 is coated either with a reflective electrically conducting material or with a transparent conductive material 120 coated on to a reflective insulating material on its inner surface. The conductor material 120 is etched into a multiplicity of electrodes, one for each pixel, as is known in the art. The conductor material 118 forms a single common electrode. The surfaces exposed to the liquid crystal are treated to confer alignment of the liquid crystal by methods known in the art. An electric field may be applied between the layers 118 and 120 by means of an external source and a switch. The area within the circle 112 is shown enlarged in FIGS. 2 and 6 for a negative and a positive dielectric anisotropy liquid crystal reflective cell respectively.

Figure 2:
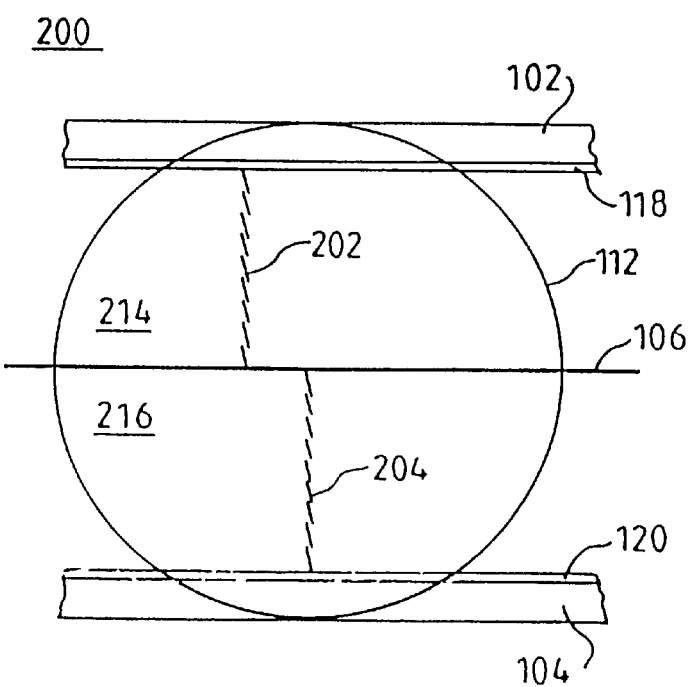
FIG. 2 shows a cross-section of the cell of FIG. 1 in which the Guest-Host mixture is negative nematic mixture and the cell is reflective.

FIG. 2 shows a first embodiment of the invention as a negative dielectric anisotropy liquid crystal cell 200. The alignment of the guest-host layer with no electric field applied is shown in compartment 214 by the lines 202 and in compartment 216 by the lines 204. The guest-host layers in both compartments 214, 216 are aligned substantially perpendicular to the cell substrates 102, 104, but are tilted slightly with respect to the perpendicular. In this state, little light is absorbed. For optimum performance, the tilt plane in the one compartment is controlled to be at a defined angle to that in the other. The tilted alignment biases the direction in which the liquid crystal molecules rotate under the application of an electric field and ensures that the liquid crystal switches as a single domain, not as a set of randomly oriented domains, which would occur in the absence of tilt. The light transmitted through both compartments 214, 216 is reflected off the rear substrate 104 and returns through the two compartments 214, 216. Substantially all of the light entering the cell 200 is reflected, a small amount being absorbed by each of the compartments 214, 216 and the rear substrate 104.

Figure 5:
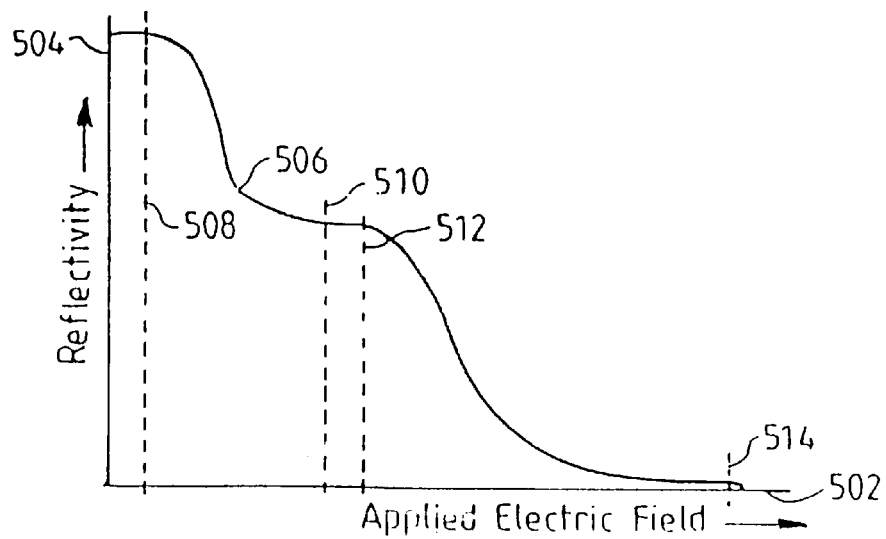
FIG. 5 shows the reflection-voltage characteristic of the cell of FIG. 2.

Referring to FIG. 5, this state corresponds to a level of reflectivity of the cell shown to the left of line 508 as no field has been applied. In FIG. 5, the electric field applied across layers 118 and 120 is represented by the x-axis 502 and the reflectivity of the cell is represented by the y-axis 504. The line 506 shows the reflectivity corresponding to a given applied field.

Figure 3:
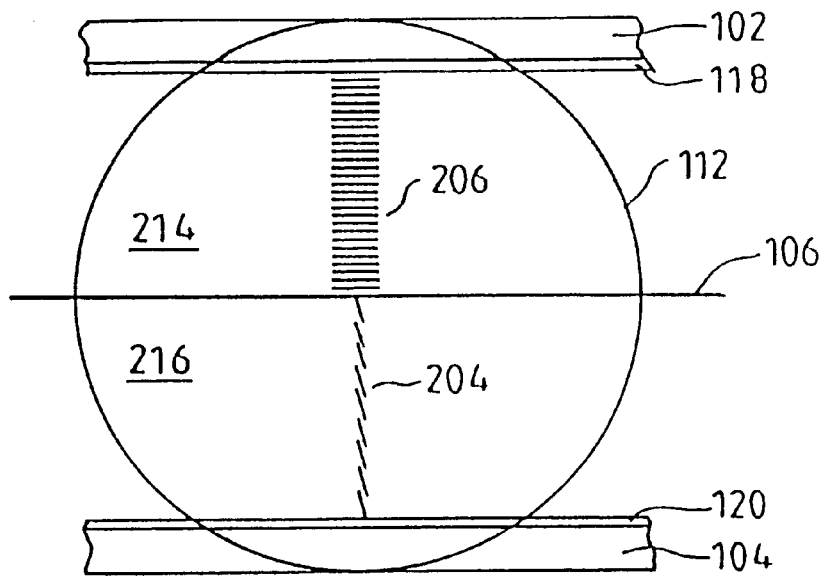
FIG. 3 shows a cross-section of the cell of FIG. 2 in which a voltage greater than the front compartment threshold has been applied.

Referring to FIG. 3, as a field is applied across electrodes 118 and 120, the guest-host layer in compartment 214 starts to align substantially parallel to the cell substrates 102, 104. In this state, light polarised parallel to the guest-host layer is substantially absorbed and light polarised perpendicular to this direction is transmitted. The guest-host layer therefore acts as a polariser in this state. Referring to FIG. 5, this state corresponds to a level of reflectivity of the cell shown to the right of line 510 and to the left of line 512 as a field sufficient to cause the guest-host layer in compartment 214 to be substantially switched, but not sufficient to cause the liquid crystal in compartment 216 to be substantially switched, has been applied. The portion of the line 506 between the line 508 and the line 510 corresponds to an applied field where the guest-host layer in compartment 214 is partially switched.

Figure 4:
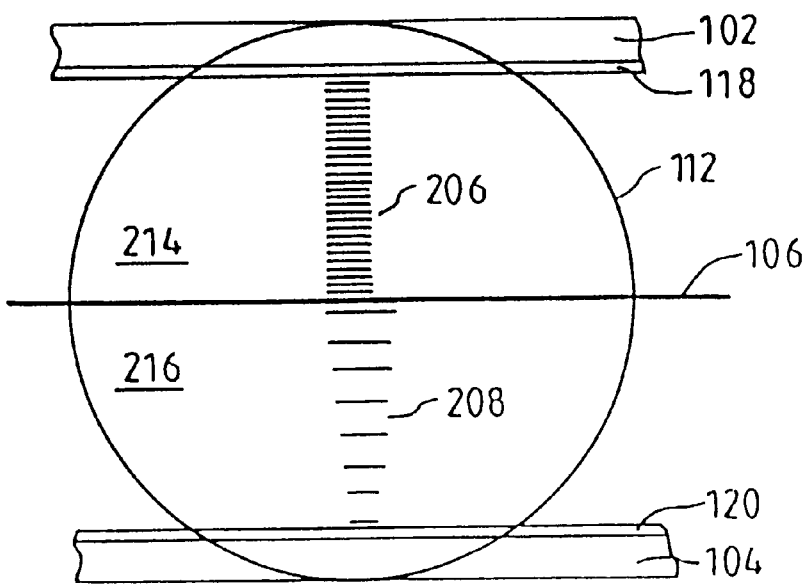
FIG. 4 shows a cross-section of the cell of FIG. 2 in which a voltage greater than the rear compartment threshold has been applied.

Referring to FIG. 4, the liquid crystal layer in compartment 216 can be a non-90 degree twisted nematic layer. The liquid crystal layer in compartment 216 absorbs little or no light in the field-off states, but modifies the reflectivity of the cell by changing the state of polarisation of light passing through it. As the field applied across the electrodes 118 and 120 is increased, the liquid crystal layer in compartment 216 starts to switch. Because of complex interference modes, light transmitted through the layer in compartment 216, reflected at electrode 120 and passing through the layer a second time becomes progressively polarised in the plane in which light is absorbed by the guest-host layer in compartment 214, and the display becomes progressively darker as the field is increased. When the field exceeds the value indicated in FIG. 5 by the line 514, the liquid crystal layer in compartment 216 has completely switched and so little light is reflected.

The effect of the guest-host layer in compartment 214 as a switchable polariser in conjunction with the liquid crystal in compartment 216, which contains no guest dye, increases the amount of light transmitted in the light state compared to a cell in which both compartments contain guest-host mixtures. However, a low reflectivity dark state and consequently a high contrast ratio is still achieved.

The threshold and switching ranges of the mixtures in the first compartment and the second compartment is dependent on the dielectric anisotropy. The greater the dielectric anisotropy, the lower the switching voltage is. The threshold and switching ranges also depend on the elastic constants of the liquid crystal. The dielectric anisotropy and the elastic constants do not provide a sufficient separation of the switching ranges. This is achieved by means of a polymer network being used to stabilise the unswitched state of the layers, meaning that the threshold and switching range are increased, as is known in the art. By also stabilising the switched state of the layers, the threshold and switching range are increased, as is known in the art.

Figure 6:
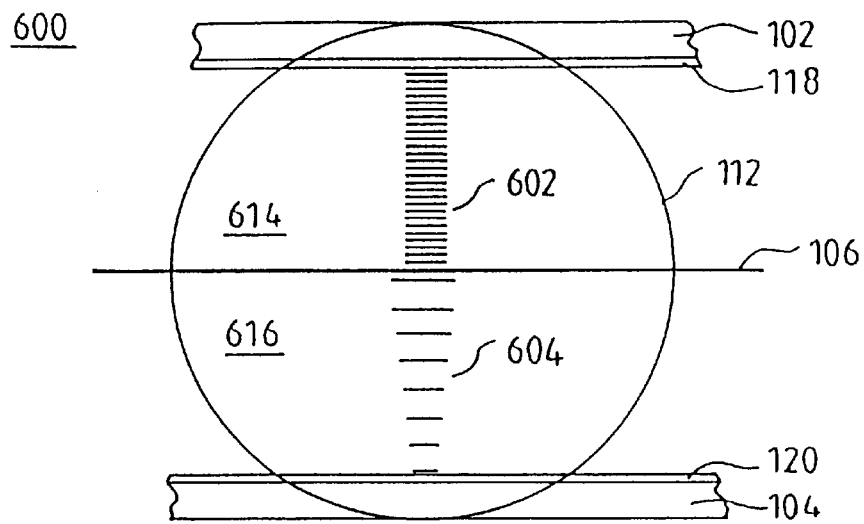
FIG. 6 shows a cross-section of the cell of FIG. 1 in which the Guest-Host mixture is positive nematic mixture and the cell is reflective.

FIG. 6 shows a second embodiment of the invention as a positive dielectric anisotropy liquid crystal cell 600. The alignment of the guest-host layer with no electric field applied is shown in compartment 614 by the lines 602 and in compartment 616 by the lines 604. The guest-host layer in compartment 616 is aligned parallel to the cell substrates 102, 104. In this state, light polarised parallel to the guest-host layer is substantially absorbed and light polarised perpendicular to this direction is transmitted. The guest-host layer therefore acts as a polariser in this state.

Figure 9:
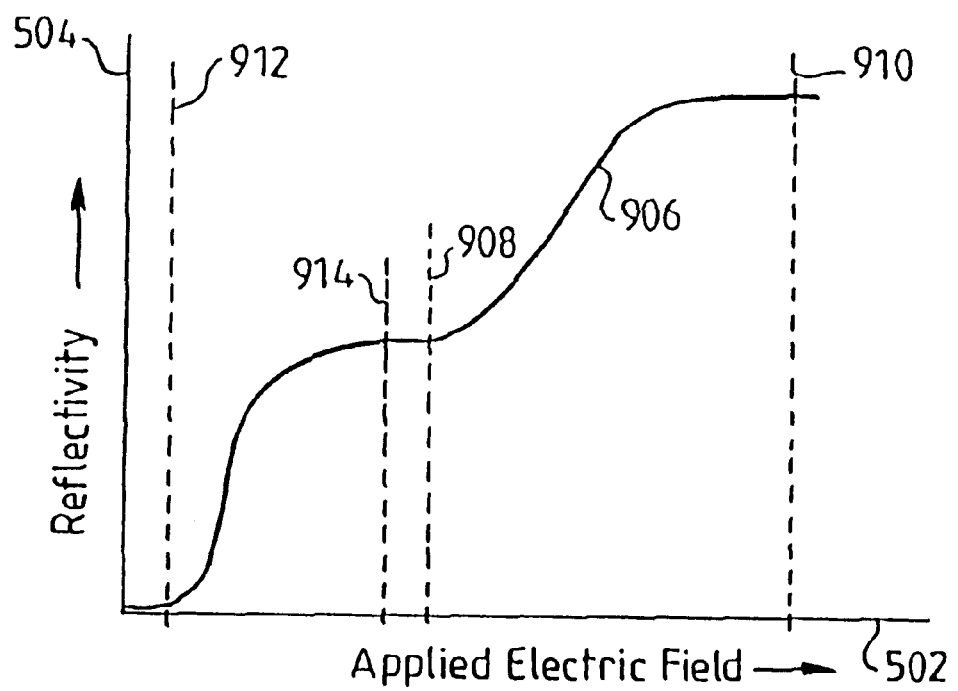
FIG. 9 shows the reflection-voltage characteristic of the cell of FIG. 6.

Referring to FIG. 9, this state corresponds to a level of reflectivity of the cell shown to the left of line 912 as no field has been applied. The line 906 shows the reflectivity corresponding to a given applied field.

Figure 7:
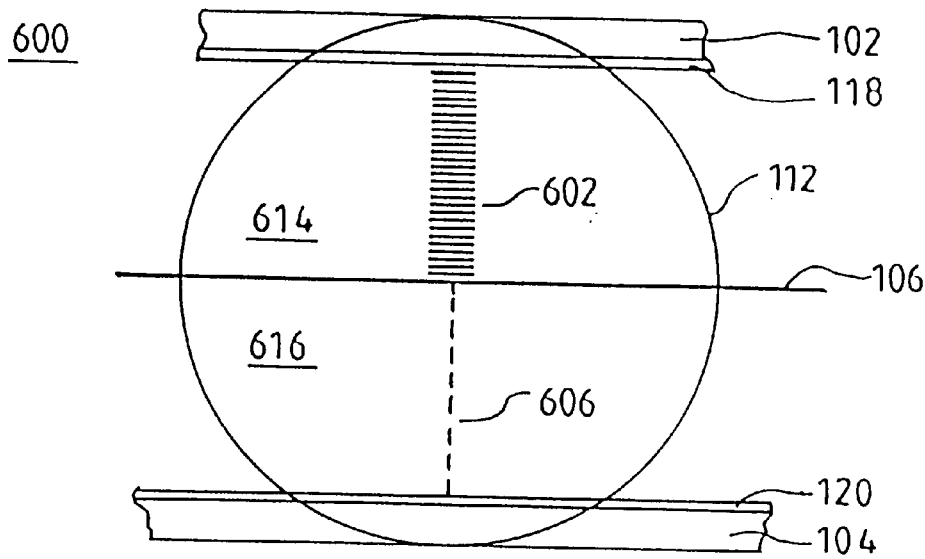
FIG. 7 shows a cross-section of the cell of FIG. 2 in which a voltage greater than the rear compartment threshold has been applied.

Referring to FIG. 7, as a field is applied across electrodes 118 and 120, the liquid crystal layer in compartment 616 starts to align substantially perpendicular to the cell substrates 102, 104. Referring to FIG. 9, this state corresponds to a level of reflectivity of the cell shown to the right of line 914 and to the left of line 908 as a field sufficient to cause the liquid crystal layer in compartment 616 to be substantially switched, but not sufficient to cause the guest-host layer in compartment 614 to be substantially switched, has been applied. The portion of the line 506 between the line 912 and the line 914 corresponds to an applied field where the guest-host layer in compartment 616 is partially switched.

Figure 8:
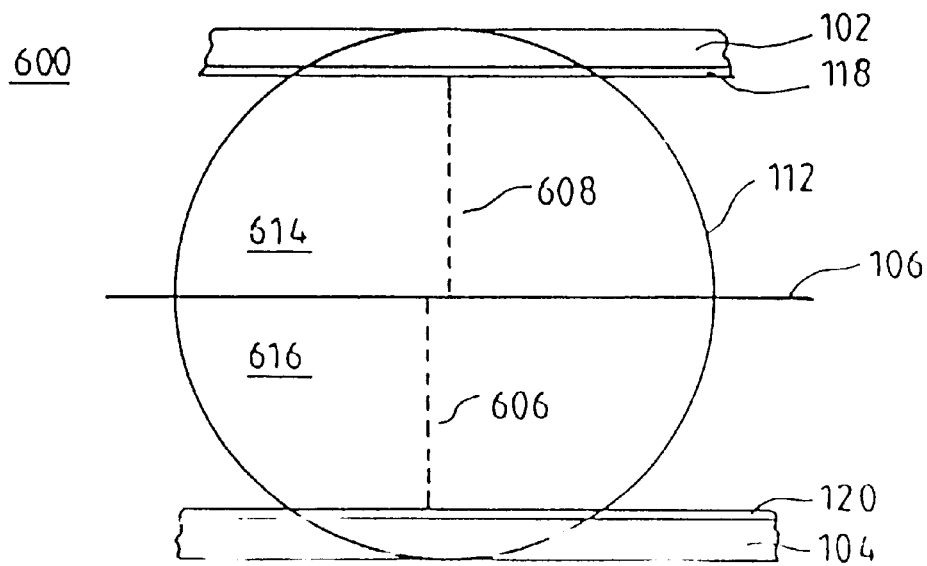
FIG. 8 shows a cross-section of the cell of FIG. 2 in which a voltage greater than the front compartment threshold has been applied.

Referring to FIG. 8, as the field applied across the electrodes 118 and 120 is increased, the guest-host liquid crystal layer in compartment 614 starts to switch. The layer switches into a progressively lighter state as the field is increased. When the field exceeds the value indicated in FIG. 9 by the line 910, the liquid crystal layer in compartment 614 has completely switched and so little light is absorbed.

The light transmitted through both compartments 614, 616 is reflected off the rear substrate 104 and returns through the compartments 614, 616. Substantially all of the light entering the cell 600 is reflected, a small amount being absorbed in compartment 614 and by the rear substrate 104.

The effect of the guest-host layer in compartment 614 as a polariser in conjunction with the liquid crystal in compartment 616 increases the amount of light reflected in the light state and hence acts to improve the reflectivity compared to a cell in which both compartments contain a guest-host layer. However, a low reflectivity dark state and therefore a satisfactory contrast ratio is still achieved.

The advantage of a negative dielectric anisotropy liquid crystal cell such as that of FIG. 2 over a positive dielectric anisotropy liquid crystal cell such as that of FIG. 6 is that the negative cell is normally white and maximum reflectivity is obtained at zero applied voltage.

In a further embodiment of the invention, a display cell having three compartments is used. A third compartment is added to the two compartment cells described above. The third compartment is separated from the second compartment by a thin transparent membrane, is located furthest from the observer and contains a guest-host mixture. The mixture is aligned substantially perpendicular to the guest-host mixture in the first compartment. In this embodiment, the first and third compartments contain guest-host mixtures and act as polarisers. The second compartment operates on the polarisation state of the light reaching it. The guest host-mixtures may have homeotropic alignment or they may have homogeneous alignment.

For a negative nematic mixture in the switched state, the guest-host layers in the first compartment and in the third compartment are orthogonal. For a positive nematic mixture in the unswitched state, the guest-host layers in the first compartment and in the third compartment are orthogonal. In a three compartment display cell, the mixture in the second compartment is optimally a 90 degree twisted nematic layer. The mixtures in the first and in the third compartment switch in the same range of applied field, which differs from the range in which the mixture in the second compartment switches.

Displays according to the present invention have contrast ratios which are inferior to those which use polarisers because the polarising efficiency of a Guest-Host layer is less than that of a sheet polariser. However, for a given contrast ratio, the reflectivity of such a display is substantially greater than that of a display which uses a polariser. In reflective displays, the simultaneous achievement of adequate contrast at high reflectivity is difficult to achieve. This invention achieves that objective. The present invention can also be applied to direct view or projection displays.

What is claimed is:

1. A liquid crystal display cell comprising at least two compartments separated by thin transparent membranes such that substantially no parallax exists between images formed in said compartments, wherein a first compartment, nearer to an observer, contains a first liquid crystal mixture and a second compartment, further from said observer, contains a second liquid crystal mixture, the electro-optic characteristics of said first and second mixtures being such that said first and second mixtures switch in a different, substantially non-overlapping range of applied electric fields.

2. A cell as claimed in claim 1 wherein there is substantially no voltage drop acros sid membranes.

3. A cell as claimed in claim 1 wherein said membranes are of the order of 1 micron or less in thickness.

4. A normally white liquid crystal display cell comprising at least two compartments separated by thin transparent membranes wherein a first compartment, nearer an observer, contains a first liquid crystal mixture and a second compartment, further from said observer, contains a second liquid crystal mixture, said first liquid crystal mixture switching substantially completely at a voltage below the threshold of said second liquid crystal mixture, said first liquid crystal mixture being a negative dielectric anisotropy guest-host mixture with homeotropic alignment and said second liquid crystal mixture being a negative dielectric anisotropy with homeotropic alignment.

5. A cell as claimed in claim 4 wherein said first and second mixtures are aligned such that said liquid crystal is tilted with respect to substrates provided therein.

6. A cell in accordance with claim 4 including a reflective substrate.

7. A normally dark liquid crystal display cell comprising at least two compartments separated by thin transparent membranes wherein a first compartment, nearer an observer, contains a first liquid crystal mixture and a second compartment, further from said observer, contains a second liquid crystal mixture, said second liquid crystal mixture switching substantially completely at a voltage below the threshold of said first liquid crystal mixture, said first liquid crystal mixture being a guest-host mixture with homogeneous alignment having a positive dielectric anisotropy and said second liquid crystal mixture being a positive dielectric anisotropy mixture with homogeneous alignment.

8. A cell in accordance with claim 7 including a reflective substrate.

9. A liquid crystal display cell comprising at least three compartments wherein a first compartment, nearest to an observer, contains a first liquid crystal mixture separated from said second compartment by a thin transparent membrane, a second compartment, further from said observer, contains a second liquid crystal mixture, wherein said first and said second mixtures switch in a different, substantially non-overlapping range of applied electric fields, and a third compartment, separated from said second compartment by a thin transparent membrane, furthest from said observer, contains a guest-host mixture, said guest-host mixture in said third compartment being aligned substantially perpendicularly to said guest-host mixture in said first compartment.

10. A cell as claimed in claim 9 wherein the guest-host mixture in the first compartment and the guest-host mixture in the third compartment have homeotropic alignment.

11. A cell as claimed in claim 9 wherein the guest-host mixture in the first compartment and the guest-host mixture in the third compartment have homogeneous alignment.

12. A cell as claimed in claim 9 wherein the mixture in the second compartment is a 90 degree twisted nematic layer.

13. A cell as claimed in claim 9 including a transmissive substrate.

* * * * *